United States Patent [19]
Toyoshima et al.

[11] Patent Number: 6,162,873
[45] Date of Patent: Dec. 19, 2000

[54] AROMATIC VINYL-CONJUGATED DIENE BLOCK COPOLYMER AND PRODUCTION PROCESS THEREOF

[75] Inventors: Tetsuya Toyoshima; Hiroaki Matsuda, both of Kanagawa, Japan

[73] Assignee: Nippon Zeon Co., Ltd., Tokyo, Japan

[21] Appl. No.: 09/082,331

[22] Filed: May 21, 1998

[30] Foreign Application Priority Data

May 22, 1997 [JP] Japan ..................................... 9-150312

[51] Int. Cl.$^7$ .......................... C08F 293/00; C08F 297/04
[52] U.S. Cl. .......................... 525/271; 525/313; 525/314; 525/316; 525/242; 526/173; 526/175; 526/340
[58] Field of Search .................................... 525/271, 313, 525/314, 316, 242; 526/173, 175, 340

[56] References Cited

U.S. PATENT DOCUMENTS

| | | |
|---|---|---|
| 3,030,346 | 4/1962 | Cooper, Jr. et al. . |
| 5,180,780 | 1/1993 | Nakamura et al. . |
| 5,393,787 | 2/1995 | Nestegard et al. . |

FOREIGN PATENT DOCUMENTS

| | | |
|---|---|---|
| 64-74209 | 3/1989 | Japan . |
| 63-64444 | 12/1998 | Japan . |
| WO9625442 | 8/1996 | WIPO . |

OTHER PUBLICATIONS

Patent Abstracts of Japan, vol. 013,No. 278 (C–611), Jun. 26, 1989 (based on JP 01–074209A dated Mar. 20, 1989).
European Search Report for EP 98 30 4412 dated Sep. 14, 1998.

Kohlthoff et al, *Journal of Polymer Science*, vol. 1, No. 5 (1946).

*Primary Examiner*—Jeffrey C. Mullis
*Attorney, Agent, or Firm*—Dinsmore & Shohl LLP

[57] ABSTRACT

Disclosed herein are an aromatic vinyl-conjugated diene block copolymer composed of a bound aromatic vinyl unit and a bound conjugated diene unit and containing at least a block aromatic vinyl segment, wherein:

(1) a content of the bound aromatic vinyl unit in the block copolymer is 3 to 60 wt. %;

(2) a proportion of block aromatic vinyl segment portions having a molecular weight at most a third of a molecular weight (A-Mp) corresponding to a peak in a molecular weight distribution curve of the block aromatic vinyl segment (A) as determined by gel permeation chromatography (GPC) is 55 to 90 mol % based on the total content of the block aromatic vinyl segment (A); and (3) a molecular weight (Mp) corresponding to a peak in a molecular weight distribution curve of the block copolymer as determined by GPC is 10,000 to 1,000,000, a production process thereof, a resin composition comprising the aromatic vinyl-conjugated diene block copolymer, and a preparation process of the resin composition.

11 Claims, No Drawings

AROMATIC VINYL-CONJUGATED DIENE BLOCK COPOLYMER AND PRODUCTION PROCESS THEREOF

FIELD OF THE INVENTION

The present invention relates to an aromatic vinyl-conjugated diene block copolymer which can provide a high-impact resin having excellent impact resistance and moreover superb susceptibility to coloring with colorants and improved in the problem of opacification or whitening when the block copolymer is used as an elastic polymer component for the high-impact resin, and a production process thereof.

The present invention also relates to a resin-modifying agent comprising, as an active ingredient, an aromatic vinyl-conjugated diene block copolymer which is excellent in impact resistance-enhancing effect and superb in improving effects on susceptibility to coloring, and a feeling of opaqueness, a resin composition comprising such a modifying agent, and a preparation process of the resin composition.

BACKGROUND OF THE INVENTION

High-impact poly(aromatic vinyl) resins such as high-impact polystyrene (HIPS) and ABS resins (acrylonitrile-butadiene-styrene resins) are polymer alloys generally obtained by blending or grafting an elastic polymer such as a conjugated diene copolymer with or on a poly(aromatic vinyl) resin to improve the impact resistance of the poly (aromatic vinyl) resin. Such a polymer alloy has a structure that the elastic polymer is dispersed in a matrix of the poly(aromatic vinyl) resin which is rigid and brittle, and is rigid and excellent in impact resistance.

High-impact poly(aromatic vinyl) resins obtained by using an aromatic vinyl-conjugated diene block copolymer as an elastic polymer have heretofore been known. The high-impact poly(aromatic vinyl) resins are generally produced by polymerizing an aromatic vinyl monomer (hereinafter referred to as "aromatic vinyl" merely) or a mixture of the aromatic vinyl and another monomer copolymerizable with the aromatic vinyl in the presence of an aromatic vinyl-conjugated diene block copolymer. As polymerization processes thereof, are used bulk polymerization, solution polymerization, bulk-suspension polymerization and the like.

However, such a high-impact poly(aromatic vinyl) resin obtained by using the aromatic vinyl-conjugated diene copolymer as an elastic polymer component has have poor susceptibility to coloring, which is considered to be attributable to insufficiency in evenly dispersing ability to colorants, and involved problems of haze development and high degree of opaqueness or whitening. In recent years, the high-impact poly(aromatic vinyl) resins have been used as housing materials for electric appliances such as televisions and air conditioners. In these uses, the high-impact poly (aromatic vinyl) resins are required to have excellent susceptibility to coloring and a low degree of opaqueness from the viewpoint of appearance.

A high-impact polystyrene resin obtained by using, as an elastic polymer component, a styrene-butadiene block copolymer, in which a molecular weight corresponding to a peak in a molecular weight distribution curve of a block styrene segment (i.e., styrene polymer block segment) as determined by gel permeation chromatography (GPC) is at least 30,000, and a proportion of block styrene segment portions having a molecular weight at most a third of the molecular weight corresponding to the peak is 25 to 50 mol % of the whole block styrene segment, has heretofore been proposed (Japanese Patent Application Laid-Open No. 74209/1989). However, this block copolymer is insufficient in improving effects on susceptibility to coloring and opacifying tendency.

OBJECTS AND SUMMARY OF THE INVENTION

It is an object of the present invention to provide an aromatic vinyl-conjugated diene block copolymer which is excellent in impact resistance-enhancing effect and superb in improving effects on susceptibility to coloring and opacifying tendency, and a production process thereof.

Another object of the present invention is to provide a resin-modifying agent comprising, as an active ingredient, an aromatic vinyl-conjugated diene block copolymer, which is excellent in improving effects on impact resistance, susceptibility to coloring and opacifying tendency, a resin composition comprising such a modifying agent, and a preparation process of the resin composition.

The present inventors have carried out an extensive investigation with a view toward solving the above-described problems involved in the prior art. As a result, it has been found that the above objects can be achieved by an aromatic vinyl-conjugated diene block copolymer composed of a bound aromatic vinyl unit and a bound conjugated diene unit and containing at least a block aromatic vinyl segment, in which a content of the bound aromatic vinyl unit in the block copolymer is 3 to 60 wt. %, a proportion of block aromatic vinyl segment portions having a molecular weight at most a third of a molecular weight (A-Mp) corresponding to a peak (hereinafter referred to as "peak top molecular weight") in a molecular weight distribution curve of the block aromatic vinyl segment (A) as determined by GPC is 55 to 90 mol % based on the total content of the block aromatic vinyl segment (A), and a peak top molecular weight (Mp) in a molecular weight distribution curve of the block copolymer as determined by GPC is 10,000 to 1,000,000.

A high-impact resin composition obtained by using the aromatic vinyl-conjugated diene block copolymer according to the present invention as an elastic polymer component has excellent impact resistance and moreover superb susceptibility to coloring with colorants and is lightened in a feeling of opaqueness. The aromatic vinyl-conjugated diene block copolymer according to the present invention can be obtained with ease by, for example, a process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of polymerizing the conjugated diene monomer and then polymerizing a mixture of the conjugated diene monomer and the aromatic vinyl monomer.

The high-impact resin composition according to the present invention can be obtained, for example, by radical-polymerizing an aromatic vinyl monomer or a mixture of the aromatic vinyl and another monomer copolymerizable with the aromatic vinyl monomer in the presence of a rubber component containing the aromatic vinyl-conjugated diene block copolymer. The aromatic vinyl-conjugated diene block copolymer according to the present invention can be used as a resin-modifying agent such as an impact modifier either singly or in combination with another rubber component and/or the like.

The present invention has been led to completion on the basis of these findings.

According to the present invention, there are thus provided the following:

1. An aromatic vinyl-conjugated diene block copolymer composed of a bound aromatic vinyl unit and a bound conjugated diene unit and containing at least a block aromatic vinyl segment, wherein:

(1) a content of the bound aromatic vinyl unit in the block copolymer is 3 to 60 wt. %;
   (2) a proportion of block aromatic vinyl segment portions having a molecular weight at most a third of a peak top molecular weight (A-Mp) in a molecular weight distribution curve of the block aromatic vinyl segment (A) as determined by gel permeation chromatography (GPC) is 55 to 90 mol % based on the total content of the block aromatic vinyl segment (A); and
   (3) a peak top molecular weight (Mp) in a molecular weight distribution curve of the block copolymer as determined by GPC is 10,000 to 1,000,000.

2. A process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of polymerizing the conjugated diene monomer and then polymerizing a mixture of the conjugated diene monomer and the aromatic vinyl monomer.

3. A resin-modifying agent comprising the above-described aromatic vinyl-conjugated diene block copolymer as an active ingredient.

4. A resin composition comprising a resin component and a rubber component, wherein the rubber component contains the above-described aromatic vinyl-conjugated diene block copolymer.

5. The resin composition according to Item 4, which further comprises a colorant.

6. A process for preparing a resin composition by radical-polymerizing an aromatic vinyl monomer or a mixture of the aromatic vinyl monomer and another monomer copolymerizable with the aromatic vinyl monomer in the presence of a rubber component, which comprises using, as the rubber component, a rubber component containing the above-described aromatic vinyl-conjugated diene block copolymer.

7. A process for preparing a colored resin composition, which comprises kneading the resin composition obtained by the above-described production process of the resin composition with a colorant.

DETAILED DESCRIPTION OF THE INVENTION

Aromatic Vinyl-Conjugated Diene Block Copolymer

The aromatic vinyl-conjugated diene block copolymer according to the present invention is a block copolymer composed of a bound aromatic vinyl unit and a bound conjugated diene unit and containing at least a block aromatic vinyl segment. The block copolymer can be obtained by copolymerizing an aromatic vinyl monomer and a conjugated diene monomer.

No particular limitation is imposed on the aromatic vinyl monomer, and examples thereof include styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferred. These aromatic vinyl monomers may be used either singly or in any combination thereof.

No particular limitation is imposed on the conjugated diene monomer, and examples thereof include 1,3-butadiene, 2-methyl-1,3-butadiene (i.e., isoprene), 2,3-dimethyl-1,3-butadiene, 2-chloro-1,3-butadiene and 1,3-pentadiene. Of these, 1,3-butadiene and 2-methyl-1,3-butadiene are preferred, with 1,3-butadiene being particularly preferred. These conjugated diene monomers may be used either singly or in any combination thereof.

With respect to proportions of the individual components in the aromatic vinyl-conjugated diene block copolymer according to the present invention, the content of the bound aromatic vinyl unit is within a range of from 3 to 60 wt. %, preferably from 5 to 45 wt. %, more preferably from 5 to 20 wt. %, while the content of the bound conjugated diene unit is within a range of from 40 to 97 wt. %, preferably from 55 to 95 wt. %, more preferably from 80 to 95 wt. %. When the content of the bound aromatic vinyl unit in the aromatic vinyl-conjugated diene block copolymer falls within this range, such a block copolymer has highly improving effects on impact resistance, susceptibility to coloring and opacifying tendency, and scarcely lowers the transparency and glossiness of resins. Therefore, the aromatic vinyl-conjugated diene block copolymer is also suitable for use in application fields of which these properties are particularly required.

No particular limitation is imposed on the microstructure of the conjugated diene segment in the aromatic vinyl-conjugated diene block copolymer according to the present invention, and it may be suitably selected as necessary for the end application intended.

The proportion of the block aromatic vinyl segment (i.e., aromatic vinyl polymer block) (A) in the aromatic vinyl-conjugated diene block copolymer according to the present invention is generally at least 40 wt. %, preferably 50 to 95 wt. %, more preferably 60 to 90 wt. % based on the total content of the bound aromatic vinyl unit. When the proportion of the block aromatic vinyl segment (A) in the aromatic vinyl-conjugated diene block copolymer falls within this range, a resin composition having highly improved impact resistance can be provided when such a block copolymer is used as a resin-modifying agent, and the transparency and glossiness of the resultant resin is scarcely lowered. Therefore, the aromatic vinyl-conjugated diene block copolymer is also suitable for use in application fields of which these properties are particularly required.

In the present invention, the content of the block aromatic vinyl segment (A) in the aromatic vinyl-conjugated diene block copolymer can be determined in accordance with a method known per se in the art. More specifically, the content is determined as that separated by filtration through a glass filter having an average pore size of 5.0 μm after oxidatively decomposing the aromatic vinyl-conjugated diene block copolymer with tert-butyl hydroperoxide using a catalytic amount of osmic acid in accordance with the decomposition method with osmic acid described in I. M. Kolthoff et al., J. Polym. Sci., 1, 429 (1946).

The peak top molecular weight (A-Mp) in the molecular weight distribution curve of the block aromatic vinyl segment (A) in the aromatic yl-conjugated diene block copolymer according to the present invention may be suitably selected as necessary for the end application intended. However, it is generally within a range of from 1,000 to 300,000, preferably from 5,000 to 100,000, more preferably from 10,000 to 75,000, most preferably from 10,000 to 50,000 as determined in terms of the molecular weight of polystyrene by gel permeation chromatography (GPC). When the peak top molecular weight (A-Mp) in the molecular weight distribution curve of the block aromatic vinyl segment (A) falls within this range, such an aromatic vinyl-conjugated diene block copolymer has a high effect to enhance impact resistance and can be suitably applied even to application fields of which high glossiness and transparency are required.

The proportion of block aromatic vinyl segment portions having a molecular weight at most a third of the peak top molecular weight (A-Mp) in the molecular weight distribution curve of the block aromatic vinyl segment (A) in the aromatic vinyl-conjugated diene block copolymer according to the present invention as determined by GPC is within a range of from 55 to 90 mol %, preferably from 55 to 80 mol %, more preferably from 55 to 70 mol %, based on the total content of the block aromatic vinyl segment (A). If the proportion of the block aromatic vinyl segment portions having a molecular weight at most a third of the peak top molecular weight (A-Mp) in the molecular weight distribution curve of the block aromatic vinyl segment (A) is too low, the improving effects of such a block copolymer on impact resistance and opacifying tendency become poor. On the other hand, it is difficult to produce any block copolymer having a too high proportion of the block aromatic vinyl segment portions having a molecular weight at most a third of the peak top molecular weight (A-Mp).

The peak top molecular weight (Mp) [weight average molecular weight (Mw)] in the molecular weight distribution curve of the aromatic vinyl-conjugated diene block copolymer according to the present invention as determined by GPC is within a range of from 10,000 to 1,000,000, preferably from 50,000 to 800,000, more preferably from 100,000 to 600,000. If the peak top molecular weight (Mp) of the aromatic vinyl-conjugated diene block copolymer is too low, its improving effect on impact resistance becomes poor. If the peak top molecular weight (Mp) is too high on the other hand, the solution viscosity of the block copolymer becomes increased, and so a problem is offered from the viewpoint of a production process of the block copolymer.

No particular limitation is imposed on a production process of the aromatic vinyl-conjugated diene block copolymer according to the present invention. However, as an example thereof, may be mentioned a process for producing an aromatic vinyl-conjugated diene block copolymer by copolymerizing an aromatic vinyl monomer and a conjugated diene monomer using an active organometallic compound as an initiator in a hydrocarbon solvent, which comprises the steps of polymerizing the conjugated diene monomer and then polymerizing a mixture of the conjugated diene monomer and the aromatic vinyl monomer.

No particular limitation is imposed on the hydrocarbon solvent, and examples thereof include aliphatic hydrocarbons such as butane, pentane and hexane; alicyclic hydrocarbons such as cyclopentane and cyclohexane; and aromatic hydrocarbons such as benzene, toluene and xylene. These hydrocarbon solvents may be used either singly or in any combination thereof.

Examples of the active organometallic compound include active organometallic compounds which permit anionic polymerization, such as organic alkali metal compounds, organic alkaline earth metal compounds and organic rare earth metal compounds of the lanthanoid series. Of these, the organic alkali metal compounds are particularly preferred from the viewpoints of polymerization reactivity and economy.

Examples of the organic alkali metal compounds include organic monolithium compounds such as n-butyllithium, sec-butyllithium, t-butyllithium, hexyllithium, phenyllithium and stilbene lithium; polyfunctional organic lithium compounds such as dilithiomethane, 1,4-dilithiobutane, 1,4-dilithio-2-ethylcyclohexane and 1,3,5-trilithiobenzene; and sodium naphthalene and potassium naphthalene. Of these, the organolithium compounds are preferred, with the organic monolithium compounds being particularly preferred.

Examples of the organic alkaline earth metal compounds include n-butylmagnesium bromide, n-hexylmagnesium bromide, ethoxycalcium, calcium stearate, t-butoxystrontium, ethoxybarium, isopropoxybarium, ethylmercaptobarium, t-butoxybarium, phenoxybarium, diethylaminobarium, barium stearate and ethylbarium.

Examples of the organic rare earth metal compounds of the lanthanoid series include composite catalysts composed of neodymium versate/triethylaluminum hydride/ethylaluminum sesquichloride as described in Japanese Patent Publication No. 64444/1988.

These active organometallic compounds may be used either singly or in any combination thereof. The amount of the active organometallic compound used is suitably selected according to a molecular weight required of a polymer formed. However, it is generally within a range of from 0.01 to 20 millimoles, preferably from 0.05 to 15 millimoles, more preferably from 0.1 to 10 millimoles per 100 g of the whole monomer used.

A proportion of the aromatic vinyl monomer used is within a range of from 3 to 60 wt. %, preferably from 5 to 45 wt. %, more preferably from 5 to 20 wt. % based on the total weight of the monomers used, while a proportion of the conjugated diene monomer used is within a range of from 40 to 97 wt. %, preferably from 55 to 95 wt. %, more preferably from 80 to 95 wt. %.

In the production process according to the present invention, the steps of polymerizing the conjugated diene monomer and then polymerizing a monomer mixture composed of the aromatic vinyl monomer and the conjugated diene monomer are provided, whereby the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be increased. If the monomer mixture is first polymerized, and the conjugated diene monomer is then polymerized, or the aromatic vinyl monomer is first polymerized, and the monomer mixture is then polymerized, the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer becomes low, so that the improving effects of the block copolymer on impact resistance and opacifying tendency become insufficient. It is hence not preferable to conduct polymerization through other steps than the steps according to the present invention.

A proportion of the aromatic vinyl monomer to the conjugated diene monomer in the monomer mixture is generally within a range of from 10:90 to 90:10, preferably from 20:80 to 80:20, more preferably from 40:60 to 70:30 in terms of a weight ratio of [aromatic vinyl]:[conjugated diene]. A proportion of the aromatic vinyl monomer to the conjugated diene monomer in the monomer mixture falling within this range is preferred in that the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be highly enhanced.

A proportion of the aromatic vinyl monomer in the monomer mixture to the whole aromatic vinyl monomer may be suitably selected as necessary for the end application intended. However, it is generally within a range of from 20 to 100 wt. %, preferably from 30 to 90 wt. %, more preferably from 40 to 80 wt. %. A proportion of the aromatic vinyl monomer in the monomer mixture to the whole aromatic vinyl monomer falling within this range is preferred in that the resulting block copolymer has a far excellent improving effect on impact resistance.

No particular limitation is imposed on a proportion of the conjugated diene polymerized prior to the polymerization of the monomer mixture to the monomer mixture. However, it is generally within a range of from 20:80 to 95:5, preferably from 40:60 to 90:10, more preferably from 50:50 to 90:10 in terms of a weight ratio of [conjugated diene]/[monomer mixture]. A proportion of the conjugated diene to the monomer mixture falling within this range is preferred in that the proportion of the block aromatic vinyl segment portions having a molecular weight at most a third of the peak top molecular weight (A-Mp) in the molecular weight distribution curve of the block aromatic vinyl segment (A) in the resulting aromatic vinyl-conjugated diene block copolymer can be highly enhanced.

No particular limitation is imposed on steps other than the steps of polymerizing the conjugated diene monomer and then polymerizing the monomer mixture in the production process according to the present invention, and it is only necessary to follow a method known per se in the art. For example, steps of polymerizing the conjugated diene monomer and the monomer mixture may be combined at random, or a step of polymerizing the aromatic vinyl monomer may be included. As preferable examples of the production process, may be mentioned ① a production process comprising only the steps of polymerizing the conjugated diene monomer and then polymerizing the monomer mixture, ② a production process comprising a step of polymerizing the aromatic vinyl monomer after the steps of polymerizing the conjugated diene monomer and then polymerizing the monomer mixture, and ③ a production process comprising steps of polymerizing the aromatic vinyl monomer and polymerizing the conjugated diene monomer after the steps of polymerizing the conjugated diene monomer and then polymerizing the monomer mixture.

When the step of polymerizing the aromatic vinyl monomer, the step of polymerizing the conjugated diene monomer and the step of polymerizing the monomer mixture are symbolized as (a), (b) and (a/b), respectively, specific examples of the production process according to the present invention include processes through the following respective steps:

(b)→(a/b);
(b)→(a/b)→(b)→(a/b);
(b)→(a/b)→(a/b);
(a/b)→(b)→(a/b);
(a)→(b)→(a/b);
(b)→(a/b)→(a);
(b)→(a/b)→(a)→(b);
(b)→(a/b)→(a)→(b)→(a);
(b)→(a/b)→(b)→(a);
(b)→(a/b)→(b)→(a)→(b);
(b)→(a/b)→(b)→(a)→(b)→(a);
(b)→(a/b)→(b)→(a)→(b)→(a)→(b);
(b)→(a/b)→(a)→(b)→(a)→(b)→(a); and
(b)→(a/b)→(a/b)→(a).

Of these, preferred are the processes through the following respective steps:

(b)→(a/b)→(a);
(b)→(a/b)→(a)→(b)→(a); and
(b)→(a/b)→(a)→(b)→(a)→(b)→(a), with the process through the steps of (b)→(a/b)→(a) being particularly preferred.

Proportions of the monomer(s) used in the individual steps are suitably selected. For example, in the process through the steps of (b)→(a/b)→(a), the proportion in the step (b) is generally within a range of from 20 to 95 wt. %, preferably from 40 to 90 wt. %, more preferably from 50 to 90 wt. % based on the total weight of the monomers; the proportion in the step (a/b) is generally within a range of from 5 to 80 wt. %, preferably from 10 to 60 wt. %, more preferably from 9 to 49 wt. %; and the proportion in the step (a) is generally within a range of from 0 to 30 wt. %, preferably from 0 to 20 wt. %, more preferably from 1 to 15 wt. %.

In the production process according to the present invention, a polar compound such as a Lewis base may be added upon the polymerization reaction as needed. Examples of the Lewis base include ethers such as tetrahydrofuran, diethyl ether, dioxane, ethylene glycol dimethyl ether, ethylene glycol dibutyl ether, diethylene glycol dimethyl ether and diethylene glycol dibutyl ether; tertiary amines such as tetramethylethylenediamine, trimethylamine, triethylamine, pyridine and quinuclidine; alkali metal alkoxides such as potassium t-amyloxide and potassium t-butoxide; and phosphines such as triphenylphosphine. These Lewis bases may be suitably used either singly or in any combination thereof within limits not impeding the objects of the present invention.

The polymerization reaction may be either an isothermal reaction or an adiabatic reaction and is generally conducted at a polymerization temperature ranging from 0 to 150° C., preferably from 20 to 120° C. After completion of the polymerization reaction, a polymer formed can be collected by a method known per se in the art, for example, by adding an alcohol such as methanol or isopropanol as a terminator to terminate the polymerization reaction, adding an antioxidant (stabilizer) and a crumbing agent to remove the solvent by a method such as direct drying or steam stripping and then drying the residue.

Resin Composition

The resin-modifying agent according to the present invention comprises the above-described aromatic vinyl-conjugated diene block copolymer as an active ingredient and is particularly useful as an impact modifier (toughening agent).

The resin composition according to the present invention is a composition comprising a resin component and a rubber component containing the aromatic vinyl-conjugated diene block copolymer according to the present invention.

Specific examples of the resin component used in the present invention, i.e., a resin to be modified, include thermosetting resins such as epoxy resins, xylene resins, guanamine resins, diallyl phthalate resins, phenol resins, unsaturated polyester resins, polyimide resins, polyurethane resins, maleic acid resins, melamine resins and urea resins; aromatic vinyl type thermoplastic resins such as acrylonitrile-acrylate-styrene resins, acrylonitrile-ethylene-styrene resins, acrylonitrile-styrene resins, acrylonitrile-butadiene-styrene resins, polystyrene resins, high-impact polystyrene resins (HIPS) and methyl methacrylate-styrene resins; and engineering plastics such as poly(phenylene ether), polyamide, polycarbonate, polyacetal and polyester.

Of these, the aromatic vinyl type thermoplastic resins, unsaturated polyester resins and poly(phenylene ether) are preferred, with the aromatic vinyl type thermoplastic resins being particularly preferred. These resins may be used either singly or in any combination thereof.

As the rubber component used in the present invention, is used the aromatic vinyl-conjugated diene block copolymer according to the present invention alone, or a mixture of the aromatic vinyl-conjugated diene block copolymer and another rubber. The content of the aromatic vinyl-conjugated diene block copolymer according to the present invention in the rubber component is suitably selected as necessary for the end application intended. However, it is generally at least 30 wt. %, preferably at least 50 wt. %, more preferably at least 70 wt. %. If the aromatic vinyl-conjugated diene block copolymer according to the present invention is not contained in the rubber component, the resulting resin composition comes to have poor susceptibility to coloring and high opacifying tendency, and is hence not preferred.

No particular limitation is imposed on another rubber, and any other rubber component routinely used as a toughening agent for resins may be added. Specific examples thereof include other aromatic vinyl-conjugated diene block copolymers than the aromatic vinyl-conjugated diene block copolymers according to the present invention, low-cis-polybutadiene rubber, high-cis-polybutadiene rubber, styrene-butadiene random copolymer rubber, polyisoprene rubber and natural rubber.

A proportion of the above rubber component to the resin component is suitably selected according to the end application intended and the kind and content of the aromatic vinyl-conjugated diene block copolymer. However, it is generally within a range of from 0.1 to 30 parts by weight, preferably from 1 to 20 parts by weight, more preferably from 3 to 15 parts by weight per 100 parts by weight of the resin component. It is preferable that the proportion of the rubber component should fall within this range, since its improving effects on impact resistance, susceptibility to coloring and opacifying tendency are well balanced, and appearance properties such as gloss and transparency and the physical properties inherent in the resin to be modified, such as tensile strength and stiffness are not very deteriorated.

No particular limitation is imposed on a preparation process of the resin composition according to the present invention. As an example thereof, may be mentioned a process in which the resin component and the rubber component containing the aromatic vinyl-conjugated diene block copolymer are mechanically mixed with each other. When the resin component is an aromatic vinyl type thermoplastic resin, a process in which an aromatic vinyl monomer or a mixture of the aromatic vinyl monomer and another monomer copolymerizable therewith is radical-polymerized in the presence of the rubber component containing the aromatic vinyl-conjugated diene block copolymer is preferred.

Examples of the aromatic vinyl monomer used in the preparation of the resin composition include styrene, α-methylstyrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene and vinylnaphthalene. Of these, styrene is preferred. These aromatic vinyl monomers may be used either singly or in any combination thereof.

Examples of the monomer copolymerizable with the aromatic vinyl monomer include unsaturated nitrile monomers such as acrylonitrile, methacrylonitrile, α-chloroacrylonitrile; (meth)acrylic ester monomers such as methyl methacrylate and methyl acrylate; unsaturated fatty acid monomers such as acrylic acid, methacrylic acid and maleic anhydride; and phenylmaleimide.

Of these, the unsaturated nitrile monomers, (meth)acrylic ester monomers and unsaturated fatty acid monomers are preferred, with the unsaturated nitrile monomers being particularly preferred. These monomers copolymerizable with the aromatic vinyl monomer may be used either singly or in any combination thereof.

A proportion of the aromatic vinyl monomer to the monomer copolymerizable with the aromatic vinyl monomer to be used is suitably selected as necessary for the end application intended. However, it is generally within a range of from 20:80 to 100:0, preferably from 40:60 to 100:0, more preferably from 60:40 to 100:0 in terms of a weight ratio of [aromatic vinyl monomer]:[monomer copolymerizable with the aromatic vinyl monomer].

A proportion of the rubber component used may be suitably selected as necessary for the end application intended. However, it is generally within a range of from 0.1 to 30 parts by weight, preferably from 1 to 20 parts by weight, more preferably from 3 to 15 parts by weight per 100 parts by weight of the above monomer(s). It is preferable that the proportion of the rubber component should fall within this range, since its improving effects on impact resistance, susceptibility to coloring and opacifying tendency become high, and appearance properties such as gloss and transparency and the physical properties inherent in the resin to be modified, such as tensile strength and stiffness are not very deteriorated.

No particular limitation is imposed on the radical polymerization process. Examples thereof include a bulk polymerization process, a solution polymerization process, a suspension polymerization process and multi-stage polymerization processes such as a bulk-suspension two-stage polymerization process. Of these, the bulk polymerization process and bulk-suspension two-stage polymerization process are particularly preferred. The bulk polymerization process is preferably a continuous bulk polymerization process.

When the resin composition according to the present invention is prepared by the continuous bulk polymerization process, the composition is prepared, for example, in accordance with the following process. The aromatic vinyl-conjugated diene block copolymer is dissolved in the aromatic vinyl monomer or a mixture of the aromatic vinyl monomer and the monomer copolymerizable therewith, and a diluent solvent, an internal lubricant such as liquid paraffin or mineral oil, an antioxidant, a chain transfer agent and the like are added to the solution as needed. Thereafter, in the case of non-catalytic polymerization, polymerization is conducted under heat, generally, at 80 to 200° C., while polymerization is conducted in the presence of a catalyst, generally, at 20 to 200° C. in the case of catalytic polymerization. The polymerization is continued until the conversion of the monomer(s) (the aromatic vinyl monomer or the mixture of the aromatic vinyl monomer and the monomer copolymerizable therewith) into a polymer reaches 60% to 90%. In this case, it is preferable to use the catalyst.

In general, an organic peroxide or azo catalyst is used as the polymerization catalyst. The organic peroxide is preferred. Examples of the organic peroxide include peroxyketals such as 1,1-bis(t-butylperoxy)cyclohexane and 1,1-bis(t- butylperoxy)-3,3,5-trimethylcyclohexane; dialkyl peroxides such as di-t-butyl peroxide and 2,5-dimethyl-2,5-di(t-butylperoxy)hexane; diacyl peroxides such as benzoyl peroxide and m-toluoyl peroxide; peroxycarbonates such as dimethylstyryl peroxydicarbonate; peroxy esters such as t-butylperoxyisopropyl carbonate; ketone peroxides such as cyclohexanone peroxide; and hydroperoxides such as p-mentha hydroperoxide. These polymerization catalysts may be used either singly or in any combination thereof. A proportion of the polymerization catalyst used is generally 0.001 to 5 parts by weight, preferably 0.005 to 3 parts by weight, more preferably 0.01 to 1 part by weight per 100 parts by weight of the monomer(s).

Examples of the diluent solvent include aromatic hydrocarbons such as benzene, toluene, xylene and ethylbenzene; alicyclic hydrocarbons such as cyclohexane, methylcyclohexane and cyclopentane; aliphatic hydrocarbons such as n-butane, n-hexane and n-heptane; and ketones such as methyl isopropyl ketone. The aromatic hydrocarbons are preferred. These diluent solvents may be used either singly or in any combination thereof. A proportion of the solvent used is generally 0 to 25 wt. % based on the total weight of the monomer(s) used.

Examples of the chain transfer agent include a dimer of α-methylstyrene; mercaptans such as n-dodecyl mercaptan and t-dodecyl mercaptan; terpenes such as 1-phenylbutene-2-fluorene and dipentene; and halogen compounds such as chloroform.

After completion of the polymerization process, the resin composition formed can be collected in accordance with a method known per se in the art, for example, by removing unreacted monomers and the diluent solvent by solvent removal by heating under reduced pressure, or extrusion by means of an extruder designed so as to remove volatile matter. The thus-obtained resin composition is optionally pelletized or powdered to put to practical use.

In the case of the bulk-suspension polymerization process, in general, polymerization is partially conducted in the same manner as in the bulk polymerization process until the conversion of the monomer(s) into a polymer reaches 30% to 50%, and a polymerization mixture containing the partially polymerized polymer thus obtained is then suspended in water in the presence of a suspension stabilizer such as polyvinyl alcohol or carboxymethyl cellulose and/or a surfactant such as sodium dodecylbenzenesulfonate to complete the reaction. The high-impact resin composition thus formed is isolated by a method such as separation by filtration or centrifugation, washed with water and dried, and moreover pelletized or powdered as needed.

No particular limitation is imposed on the average particle size of the rubber component containing the aromatic vinyl-conjugated diene block copolymer in a matrix of the resin component. However, it is preferable that the particle size should be generally within a range of from 0.01 to 10 μm, preferably from 0.1 to 5 μm, more preferably from 0.5 to 3 μm, since the impact resistance-enhancing effect becomes marked.

The resin composition according to the present invention has excellent susceptibility to coloring, so that a colorant can be uniformly dispersed therein. No particular limitation is imposed on the colorant, and any colorants routinely used in resin industry such as rubber and plastics may be used. As the colorant, a pigment is generally used.

The pigment may be either an inorganic pigment or an organic pigment. Specific examples of the pigment include Quinacridone Red, Para Red, Fire Red, Permanent Red, F5R, Brilliant Carmine 6B, Lithol Red, Pigment Scarlet 3B, Alizarine Lake, Alizarine Maroon, Helio Bordeaux, thioindigo, Toluidine Maroon, Dioxazine Violet, Lake Red C, Pyrazolone Red, Naphthol Red, Anthraquinone Red, Isoindolinone Red, Anthraquinone Yellow, Benzidine Yellow, Hansa Yellow, Permanent Yellow HR, Benzidine Orange, Isoindolinone Yellow, Green Gold, Phthalocyanine Blue, Phthalocyanine Green, PTA Blue, PMA Blue, Pigment Green B, Indanthrene Blue, carbon black, bone black, Aniline Black, titanium oxide, zinc sulfide, zinc white, cadmium red, cadmium mercury red, red iron oxide, manganese violet, cadmium yellow, chrome yellow, chrome vermilion, zinc yellow, Titan Yellow, yellow iron oxide, brown iron oxide, black iron oxide, cobalt blue, iron blue, ultramarine blue, chrome green, chromium oxide and viridian.

Of these, Quinacridone Red, Para Red, Fire Red, Permanent Red, Brilliant Carmine 6B, Pigment Scarlet 3B, Alizarine Lake, Alizarine Maroon, Helio Bordeaux, thioindigo, Dioxazine Violet, Lake Red C, Pyrazolone Red, Anthraquinone Red, Isoindolinone Red, Anthraquinone Yellow, Benzidine Yellow, Benzidine Orange, Isoindolinone Yellow, Green Gold, Phthalocyanine Blue, Phthalocyanine Green, Indanthrene Blue, carbon black, bone black, titanium oxide, zinc sulfide, cadmium red, cadmium mercury red, red iron oxide, manganese violet, cadmium yellow, chrome yellow, chrome vermilion, zinc yellow, Titan Yellow, yellow iron oxide, brown iron oxide, black iron oxide, cobalt blue, iron blue, ultramarine blue, chrome green, chromium oxide and viridian are preferred.

Even of these, Para Red, Fire Red, Pigment Scarlet 3B, Anthraquinone Red, Isoindolinone Red, Benzidine Orange, Green Gold, Phthalocyanine Blue, Phthalocyanine Green, carbon black, titanium oxide, cadmium red, cadmium mercury red, red iron oxide, cadmium yellow, Titan Yellow, yellow iron oxide, brown iron oxide, cobalt blue, ultramarine blue and chrome green are particularly preferred.

These colorants may be used either singly or in any combination thereof. The amount of the colorant incorporated may be suitably selected according to the kind of the colorant used and the end application intended. However, it is generally within a range of from 0.1 to 20 parts by weight, preferably from 0.5 to 10 parts by weight, more preferably from 1 to 5 parts by weight per 100 parts by weight of the resin composition.

To the resin composition according to the present invention, other compounding ingredients routinely used in resin industry may be added in addition to the colorants as needed. Specific examples of compounding ingredients usable in the resin composition include mineral oil, liquid paraffin, organic polysiloxane, organic or inorganic fillers, stabilizers, plasticizers, lubricants, ultraviolet absorbents, parting agents, antistatic agents and flame retardants.

The organic or inorganic fillers include various kinds of powdery or fibrous fillers, and specific examples thereof include silica, diatomaceous earth, alumina, titanium oxide, magnesium oxide, pumice powder, pumice balloon, basic magnesium carbonate, dolomite, calcium sulfate, potassium titanate, barium sulfate, calcium sulfite, talc, clay, mica, asbestos, glass fiber, glass flake, glass beads, calcium silicate, montmorillonite, bentonite, graphite, aluminum powder, molybdenum sulfide, boron fiber, silicon carbide fiber, polyethylene fiber, polypropylene fiber, polyester fiber and polyamide fiber.

Examples of the stabilizers include phenolic antioxidants such as octadecyl-3-(3,5-di-t-butyl-4-hydroxyphenyl) propionate, tetrakis[methylene-3(3,5-di-t-butyl-4-hydroxyphenyl)propionate]methane, alkyl β-(3,5-di-t-butyl- 4-hydroxyphenyl)propionates and 2,2'-oxamidobis[ethyl-3 (3,5-di-t-butyl-4-hydroxyphenyl)propionate]; and phosphoric stabilizers such as trisnonylphenyl phosphate, tris(2,4-di-t-butylphenyl)phosphate and tris(2,4-di-t-butylphenyl)phosphate.

No particular limitation is imposed on the flame retardants, and halogen-containing flame retardants are generally used. Various kinds of chlorine- or bromine-containing flame retardants may be used as the halogen-containing flame retardants. However, the bromine-containing flame retardants are preferred from the viewpoints of flameproofing effect, heat resistance upon forming or molding, dispersibility in the resin and influence on the physical properties of the resin. Examples of the bromine-containing flame retardants include hexabromobenzene, pentabromoethylbenzene, hexabromobiphenyl, decabromodiphenyl, hexabromodiphenyl oxide, octabromodiphenyl oxide, decabromodiphenyl oxide, pentabromocyclohexane, tetrabromobisphenol A and derivatives thereof [for example, tetrabromobisphenol A-bis (hydroxyethyl ether), tetrabromobisphenol A-bis(2,3-dibromopropyl ether), tetrabromobisphenol A-bis (bromoethyl ether), tetrabromobisphenol A-bis(allyl ether), etc.], tetrabromobisphenol S and derivative thereof [for example, tetrabromobisphenol S-bis(hydroxyethyl ether), tetrabromobisphenol S-bis(2,3-dibromopropyl ether), etc.], tetrabromophthalic anhydride and derivatives thereof [for example, tetrabromophthalimide, ethylenebistetrabromophthalimide, etc.], ethylenebis(5,6-dibromonorbornene-2,3-dicarboxyimide), tris-(2,3-dibromopropyl-1)isocyanurate, adducts of hexabromocyclopentadiene by Diels-Alder reaction, tribromophenyl glycidyl ether, tribromophenyl acrylate, ethylenebistribromophenyl ether, ethylenebispentabromophenyl ether, tetradecabromodiphenoxybenzene, brominated polystyrene, brominated polyphenylene oxide, brominated epoxy resins, brominated polycarbonate, polypentabromobenzyl acrylate, octabromonaphthalene, hexabromocyclododecane, bis (tribromophenyl)fumaramide and N-methylhexabromodiphenylamine.

In order to more effectively exhibit the flameproofing effect of the flame retardant, for example, an antimonial flame retardant auxiliary such as antimony trioxide, antimony pentoxide, sodium antimonate or antimony trichloride may be used in combination as a flame retardant auxiliary.

These other compounding ingredients may be used either singly or in any combination thereof. The used amount thereof may be suitably selected within limits not impeding the objects of the present invention.

These colorant and other compounding ingredients may be mechanically mixed either ① with the resin component and the rubber component or ② with the resin composition obtained by radical-polymerizing the aromatic vinyl monomer or the mixture of the aromatic vinyl monomer and the monomer copolymerizable with the aromatic vinyl monomer in the presence of the rubber component containing the aromatic vinyl-conjugated diene block copolymer. The method of the latter ② is preferred in that the colorant can be more uniformly dispersed, and the resin composition is excellently colored. The mechanical mixing may be conducted by means of any of various kinds of kneading machines such as a single- or twin-screw extruder, a Banbury mixer, rolls and a kneader in accordance with a method known per se in the art. The mixing temperature is generally within a range of from 100 to 250° C.

ADVANTAGES OF THE INVENTION

According to the present invention, there are provided aromatic vinyl-conjugated diene block copolymers which are excellent in impact resistance-enhancing effect and superb in improving effects on susceptibility to coloring and opacifying tendency, and a production process thereof. According to the present invention, there are also provided resin-modifying agents comprising, as an active ingredient, an aromatic vinyl-conjugated diene block copolymer, which is excellent in improving effects on impact resistance, susceptibility to coloring and opacifying tendency, resin compositions containing such a modifying agent, and a preparation process of the resin compositions. The aromatic vinyl-conjugated diene block copolymers according to the present invention are particularly useful as elastic polymer components (impact modifiers) for high-impact poly (aromatic vinyl) resins.

EMBODIMENTS OF THE INVENTION

The present invention will hereinafter be described more specifically by the following Preparation Examples Examples and Comparative Examples. All designations of "part" or "parts" and "%" as will be used in the following examples mean part or parts by weight and wt. % unless expressly noted. Various properties of polymers were determined in accordance with the following respective methods:

(1) The content of the bound aromatic vinyl unit in a block copolymer sample was determined by measuring an intensity at a peak of infrared absorption with a phenyl group at a wave number of about 700 cm$^{-1}$ and comparing the intensity with a calibration curve obtained in advance.

(2) The peak top molecular weight (Mp) of a block copolymer sample was expressed by a value measured in terms of polystyrene by gel permeation chromatography (GPC) making use of tetrahydrofuran (THF) as a solvent.

(3) The content of the block aromatic vinyl segment (A) in an aromatic vinyl-conjugated diene block copolymer sample was determined in accordance with the decomposition method with osmic acid described in L. M. Kolthoff et al., J. Polym. Sci., 1, 429 (1948). More specifically, 0.05 g of the block copolymer were dissolved in 10 ml of carbon tetrachloride. To the solution, were added 16 ml of a 70% aqueous solution of tert-butyl hydroperoxide and 4 ml of a 0.05% chloroform solution of osmium tetrachloride. The resultant mixture was heated under reflex for 15 minutes in a bath heated to 90° C. to conduct an oxidative decomposition reaction. After completion of the reaction, the resultant reaction mixture was cooled, and 200 ml of methanol were added to the reaction mixture under stirring to precipitate a block aromatic vinyl component. The precipitated block aromatic vinyl component was then separated by filtration through a glass filter having an average pore size of 5 μm. The weight of the thus-obtained product was measured, and the segment content was expressed as a percentage to the total content of the bound aromatic vinyl unit in the aromatic vinyl-conjugated diene block copolymer.

(4) The peak top molecular weight (A-Mp) of the block aromatic vinyl segment (A) was determined by dissolving the block aromatic vinyl component separated in the method (3) in THF and expressed by a value measured in terms of polystyrene by GPC.

(5) The proportion of block aromatic vinyl segment portions having a molecular weight at most a third of a peak top molecular weight (A-Mp) in a molecular weight distribution curve of the block aromatic vinyl segment (A) was calculated out in accordance with the method for finding an area proportion of a retention volume (hereinafter abbreviated as "$V_R$") unit, which is described in Japanese Patent Application Laid-Open No. 74209/1989, and expressed by mol %.

More specifically, in the case of the present invention, a weight proportion (W1) per 5.835 μl of $V_R$ was calculated to determine a molecular weight (M1) in each $V_R$ from a correlation curve (calibration curve). From this value, a ratio (W1/M1) of the number of moles in each $V_R$ was determined, and a proportion of the number of moles in each $V_R$ was found from (W1/M1)/Σ(W1/M1). From this data, the proportion of portions having a molecular weight at most a third of the peak top molecular weight was calculated.

(6) Izod impact strength was determined in accordance with JIS K 7110 and expressed by an index (the greater the numerical value, the better the Izod impact strength) assuming that the value of a comparative example was 100.

(7) Evaluation (haze) as to opacifying tendency, i.e., a feeling of opaqueness was conducted by injection-molding a resin composition sample in a mold 100 mm long, 50 mm wide and 2 mm thick with a single pin gate to produce a test specimen and subjecting the test specimen to measurement in accordance with JIS K 6714, and was expressed by an index (the smaller the numerical value, the better the evaluation) assuming that the value of a comparative example was 100.

(8) The susceptibility to coloring was determined by injection-molding a resin composition sample with a yellow pigment kneaded therein to produce a test specimen (100 mm×60 mm×2 mm) and measuring the yellowness of the test specimen in accordance with JIS K 7103, and was expressed by an index (the greater the numerical value, the better the susceptibility to coloring) assuming that the value of a comparative example was 100.

EXAMPLE 1

Preparation Example of a Block Copolymer

After a 2-kiloliter reactor equipped with a stirrer, reflux condenser and jacket was washed, dried and purged with nitrogen, 600 kg of cyclohexane purified and dried in advance, and 75.5 kg of butadiene were charged into the reactor. After the mixture was heated to 50° C., 320 ml of a hexane solution (1.65 mmol/ml) of n-butyllithium were added to start polymerization (first stage of polymerization). At the time a conversion of the monomer in the reaction reached about 100%, a mixture of 9.5 kg of butadiene and 10 kg of styrene was added to polymerize them (second stage of polymerization). At the time a conversion of the monomer mixture in the reaction reached about 100%, 5 kg of styrene were further added to continue the polymerization (Third stage of polymerization). At the time a conversion of the monomer in the third-stage reaction reached about 100%, 10 mmol of isopropyl alcohol were added to terminate the polymerization, and 200 g of a phenolic antioxidant (Irganox 1076, trade name, product of CIBA-GEIGY AG) were then added. Thereafter, the solvent was removed by steam stripping, and the residue was dried under reduced pressure to obtain Block Copolymer A.

With respect to the thus-obtained Block Copolymer A, the content of the bound aromatic vinyl unit, the peak top molecular weight (Mp) of the block copolymer, the content of the block aromatic vinyl segment (A), the peak top molecular weight (A-Mp) in the molecular weight distribution curve of the block aromatic vinyl segment (A), and the proportion of block aromatic vinyl segment portions having a molecular weight at most a third of the peak top molecular weight (A-Mp) in the molecular weight distribution curve of the block aromatic vinyl segment (A) were determined. The results thereof are shown in Table 1.

EXAMPLES 2 AND 3

Block Copolymers B and C were produced in accordance with the same process as in Example 1 except that the polymerization conditions were respectively changed to those shown in Table 1, and the copolymers were evaluated in the same manner as in Example 1. The results are shown in Table 1.

COMPARATIVE EXAMPLE 1

After a 2-kiloliter reactor equipped with a stirrer, reflux condenser and jacket was washed, dried and purged with nitrogen, 600 kg of cyclohexane purified and dried in advance, 15 mmol of tetramethylethylenediamine (TMEDA), 90 kg of butadiene and 7 kg of styrene were charged into the reactor. After the mixture was heated to 60° C., 330 ml of a hexane solution (1.65 mmol/ml) of n-butyllithium were added to start polymerization (first stage of polymerization). At the time a conversion of the monomers in the reaction reached about 100%, 3 kg of styrene were further added to conduct polymerization until a conversion of the monomer in the reaction reached about 100%. Thereafter, 10 mmol of isopropyl alcohol were added to terminate the polymerization, and 200 g of a phenolic antioxidant (Irganox 1076, trade name, product of CIBA-GEIGY AG) were then added. The solvent was then removed by steam stripping, and the residue was dried under reduced pressure to obtain Block Copolymer D.

With respect to the thus-obtained Block Copolymer D, the content of the bound aromatic vinyl unit, the peak top molecular weight (Mp) of the block copolymer, the content of the block aromatic vinyl segment (A), the peak top molecular weight (A-Mp) in the molecular weight distribution curve of the block aromatic vinyl segment (A), and the proportion of block aromatic vinyl segment portions having a molecular weight at most a third of the peak top molecular weight (A-Mp) in the molecular weight distribution curve of the block aromatic vinyl segment (A) were determined. The results thereof are shown in Table 1.

COMPARATIVE EXAMPLES 2 AND 3

Block Copolymers E and F were produced in accordance with the same process as in Comparative Example 1 except that the polymerization conditions were respectively changed to those shown in Table 1, and the copolymers were evaluated in the same manner as in Comparative Example 1. The results are shown in Table 1.

TABLE 1

|  | Example | | | Comparative Example | | |
|---|---|---|---|---|---|---|
|  | 1 | 2 | 3 | 1 | 2 | 3 |
| Polymer code | A | B | C | D | E | F |
| Amount of cyclohexane (kg) | 600 | 600 | 600 | 600 | 600 | 600 |
| Amount of n-butyl-lithium added (ml) | 320 | 310 | 300 | 330 | 310 | 320 |
| Amount of polar compound (*1) added (mmol) | — | — | — | — | 20 | 15 |

TABLE 1-continued

|  | Example | | | Comparative Example | | |
|---|---|---|---|---|---|---|
| Polymer code | 1<br>A | 2<br>B | 3<br>C | 1<br>D | 2<br>E | 3<br>F |
| First stage of polymerization | | | | | | |
| Butadiene (kg) | 75.5 | 77.0 | 85.5 | 90.0 | 90.0 | 85.0 |
| Styrene (kg) | — | — | — | 7.0 | 3.0 | 8.0 |
| Second stage of polymerization | | | | | | |
| Butadiene (kg) | 9.5 | 8.0 | 4.5 | — | — | — |
| Styrene (kg) | 10.0 | 11.0 | 5.5 | 3.0 | 7.0 | 7.0 |
| Third stage of polymerization) | | | | | | |
| Styrene (kg) | 5.0 | 4.0 | 4.5 | — | — | — |
| Bound styrene content (wt. %) | 15 | 15 | 10 | 10 | 10 | 15 |
| Block styrene content (%) | 77 | 60 | 88 | 85 | 80 | 70 |
| Peak top molecular weight (A-Mp) of block styrene segment | 35,000 | 32,000 | 30,000 | 33,000 | 29,000 | 29,000 |
| Proportion of portions having a molecular weight at most ⅓ of peak top molecular weight (A-Mp) of block styrene segment (mol %) | 58 | 70 | 65 | 22 | 42 | 40 |
| Peak top molecular weight (Mp) of block copolymer | 540,000 | 550,000 | 580,000 | 560,000 | 590,000 | 540,000 |

EXAMPLE 4

After 180 g of Block Copolymer A obtained in Example 1 were dissolved in 1,820 g of a styrene monomer in a stainless steel-made reactor equipped with a stirring machine, a chain transfer agent (n-dodecyl mercaptan) was added in a proportion of 250 ppm based on the styrene monomer. The resultant mixture was stirred at 130° C. for 1 hour and 20 minutes to conduct bulk polymerization. The contents were then taken out of the reactor. 1,250 g of the contents and 3,750 g of a 2% aqueous solution of polyvinyl alcohol were charged into a 8-liter stainless steel-made reactor equipped with a stirring machine, and the resultant mixture was heated to 70° C. Then, 2.5 g of benzoyl peroxide and 1.26 g of dicumyl peroxide were added to conduct suspension polymerization for 1 hour at 70° C., for 1 hour at 90° C., for 1 hour at 110° C. and for 4 hours at 130° C. After completion of the polymerization, the reaction mixture was cooled down to room temperature, and the resultant polystyrene resin composition was collected by filtration, washed with water and then dried under reduced pressure at 60° C. for 6 hours.

The polystyrene resin composition thus obtained was kneaded by rolls heated to 180° C. and formed into a sheet. The sheet was cut into pellets by means of a pelletizer for sheets. The thus-obtained pellets were injection-molded by means of an injection molding machine, SAV-30/30 (manufactured by Yamashiro Seiki-sha K.K.; mold temperature: 50° C.; nozzle tip temperature: 240° C.) to produce a test specimen, thereby evaluating the resin composition as to Izod impact strength and opacifying tendency. The results thereof are shown in Table 2.

Besides, 600 parts of the polystyrene resin composition thus obtained and 3 parts of a yellow pigment (Titan Yellow TVP-22, Yellow, trade name, product of Toyo Ink Mfg. Co., Ltd.) were kneaded for 5 minutes by means of rolls heated to 180° C. and chopped by a square-cutting pelletizer into pellets. The pellets thus obtained were injection-molded by means of an injection molding machine, SAV-30/30 (manufactured by Yamashiro Seiki-sha K.K.; mold temperature: 50° C.; nozzle tip temperature: 240° C.) to produce a test specimen (100 mm×60 mm×2 mm), thereby evaluating the resin composition as to susceptibility to coloring. The result thereof is shown in Table 2.

EXAMPLES 5 AND 6, AND COMPARATIVE EXAMPLES 4 TO 6

The experiment was conducted in the same manner as in Example 4 except that the Block Copolymers B to F produced in Examples 2 and 3, and Comparative Examples 1 to 3 were respectively used, thereby evaluating the resultant resin compositions as to Izod impact strength, opacifying tendency and susceptibility to coloring. The results thereof are shown in Table 2.

TABLE 2

|  | Example | | | Comparative Example | | |
|---|---|---|---|---|---|---|
|  | 4 | 5 | 6 | 4 | 5 | 6 |
| Kind of polymer | A | B | C | D | E | F |
| Amount of polymer added (wt. %) | 10 | 10 | 10 | 10 | 10 | 10 |
| Opacifying tendency[*1] | 96 | 88 | 94 | 109 | 104 | 100 |
| Izod impact strength[*1] | 116 | 118 | 119 | 94 | 104 | 100 |
| Susceptibility to coloring[*1] | 110 | 122 | 116 | 80 | 95 | 100 |

[*1] Each expressed by an index assuming that the value of Comparative Example 6 was 100.

What is claimed is:

1. An aromatic vinyl-conjugated diene block copolymer composed of a bound aromatic vinyl unit and a bound conjugated diene unit and containing at least a block aromatic vinyl segment and a conjugated diene homopolymer block, wherein the block copolymer is obtained by polymerizing conjugated diene monomer in a hydrocarbon solvent using an active organometallic compound as an initiator and then polymerizing a mixture of conjugated diene monomer and aromatic vinyl monomer, and further wherein:

(1) a content of the bound aromatic vinyl unit in the block copolymer is 3 to 60 wt. %;

(2) a proportion of block aromatic vinyl segment portions having a molecular weight at most a third of a molecular weight (A-Mp) corresponding to a peak in a molecular weight distribution curve of the block aromatic vinyl segment (A) as determined by gel permeation chromatography (GPC) is 55 to 90 mol % based on the total content of the block aromatic vinyl segment (A);

(3) a molecular weight (Mp) corresponding to a peak in a molecular weight distribution curve of the block copolymer as determined by GPC is 10,000 to 1,000,000; and (4) a proportion of the block aromatic vinyl segment (A) is 50 to 95 wt. % based on the total content of the bound aromatic vinyl unit.

2. The aromatic vinyl-conjugated diene block copolymer according to claim 1, wherein the content of the bound aromatic vinyl unit in the block copolymer is 5 to 20 wt. %.

3. The aromatic vinyl-conjugated diene block copolymer according to claim 1, wherein a proportion of the block aromatic vinyl segment (A) is 60 to 90 wt. % based on the total content of the bound aromatic vinyl unit.

4. The aromatic vinyl-conjugated diene block copolymer according to claim 1, wherein the molecular weight (A-Mp) corresponding to the peak in the molecular weight distribution curve of the block aromatic vinyl segment (A) as determined by GPC is 10,000 to 75,000.

5. The aromatic vinyl-conjugated diene block copolymer according to claim 1, wherein the proportion of the block aromatic vinyl segment portions having a molecular weight at most a third of the molecular weight (A-Mp) corresponding to the peak in the molecular weight distribution curve of the block aromatic vinyl segment (A) as determined by GPC is 55 to 80 mol % based on the total content of the block aromatic vinyl segment (A).

6. The aromatic vinyl-conjugated diene block copolymer according to claim 1, wherein the molecular weight (Mp) corresponding to the peak in the molecular weight distribution curve of the block copolymer as determined by GPC is 10,000 to 600,000.

7. A resin-modifying agent comprising the aromatic vinyl-conjugated diene block copolymer according to claim 1 as an active ingredient.

8. The aromatic vinyl-conjugated diene block copolymer according to claim 1, wherein the content of the bound aromatic vinyl unit in the block copolymer is 5–45 wt. %.

9. The aromatic vinyl-conjugated diene block copolymer according to claim 1, wherein the content of the bound aromatic vinyl unit in the block copolymer is 5–20 wt. %.

10. The aromatic vinyl-conjugated diene block copolymer according to claim 1, wherein the molecular weight (A-Mp) corresponding to the peak in the molecular weight distribution curve of the block aromatic vinyl segment (A) as determined by GPC is 10,000 to 50,000.

11. The aromatic vinyl-conjugated diene block copolymer according to claim 1, wherein the proportion of the block aromatic vinyl segment portions having a molecular weight at most a third of the molecular weight (A-Mp) corresponding to the peak in the molecular weight distribution curve of the block aromatic vinyl segment (A) as determined by GPC is 55 to 70 mol % based on the total content of the block aromatic vinyl segment (A).

* * * * *